US012741905B2

(12) United States Patent
Song et al.

(10) Patent No.: US 12,741,905 B2
(45) Date of Patent: Sep. 22, 2026

(54) TRANSPARENT CERAMIC GLASS FOR COOKTOP AND COOKTOP COMPRISING SAME

(71) Applicant: SAMSUNG ELECTRONICS CO., LTD., Suwon-si (KR)

(72) Inventors: Jiyoung Song, Suwon-si (KR); Hyungin Kim, Suwon-si (KR); Youngdeog Koh, Suwon-si (KR); Kwangjoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 570 days.

(21) Appl. No.: 18/214,877

(22) Filed: Jun. 27, 2023

(65) Prior Publication Data

US 2023/0391662 A1 Dec. 7, 2023

Related U.S. Application Data

(63) Continuation of application No. PCT/KR2023/005316, filed on Apr. 19, 2023.

(30) Foreign Application Priority Data

Jun. 2, 2022 (KR) ........................ 10-2022-0067819
Aug. 16, 2022 (KR) ........................ 10-2022-0102339

(51) Int. Cl.
*C03C 15/00* (2006.01)
*C03C 10/00* (2006.01)
(Continued)

(52) U.S. Cl.
CPC .......... *C03C 15/00* (2013.01); *C03C 10/0027* (2013.01); *C03C 17/3657* (2013.01); *H05B 6/1209* (2013.01)

(58) Field of Classification Search
CPC ... C03C 15/00; C03C 17/3657; C03C 17/002; C03C 17/34; C03C 2204/08;
(Continued)

(56) References Cited

U.S. PATENT DOCUMENTS 6,630,650 B2 * 10/2003 Bassill .................. H05B 6/062 219/626
8,673,461 B2 3/2014 Pelletier et al.
(Continued)

FOREIGN PATENT DOCUMENTS

EP 3 072 857 A1 9/2016
JP 2003-217811 A 7/2003
(Continued)

OTHER PUBLICATIONS

Extended European Search Report dated May 8, 2025 for European Application No. 23816220.0.
(Continued)

*Primary Examiner* — Noah S Wiese
(74) *Attorney, Agent, or Firm* — STAAS & HALSEY LLP

(57) ABSTRACT

A transparent glass-ceramic for cooktop, the transparent glass-ceramic including a glass material having an uneven layer etched on an upper surface of the glass material, an upper printed layer formed on the uneven layer, and a lower printed layer formed under the glass material.

15 Claims, 11 Drawing Sheets

(51) Int. Cl.
*C03C 17/36* (2006.01)
*H05B 6/12* (2006.01)

(58) Field of Classification Search
CPC ........... C03C 2218/365; C03C 10/0027; F24C 15/10; H05B 6/12
See application file for complete search history.

(56) References Cited

U.S. PATENT DOCUMENTS

| | | | | |
|---|---|---|---|---|
| 9,006,620 | B2 | 4/2015 | Vilato et al. | |
| 9,151,504 | B2 | 10/2015 | Lee et al. | |
| 9,296,645 | B2 | 3/2016 | Siebers et al. | |
| 9,604,871 | B2 | 3/2017 | Amin et al. | |
| 9,884,783 | B2 | 2/2018 | Henn et al. | |
| 10,450,227 | B2 | 10/2019 | Muehlke et al. | |
| 11,267,478 | B2 | 3/2022 | Siebers et al. | |
| 11,419,187 | B2 * | 8/2022 | Guillemot | H05B 3/688 |
| 2003/0006231 | A1 | 1/2003 | Nagata et al. | |
| 2013/0309448 | A1 | 11/2013 | Striegler et al. | |
| 2015/0144613 | A1 * | 5/2015 | Guillemot | H05B 3/688 219/460.1 |
| 2020/0361813 | A1 * | 11/2020 | Roux | C03C 17/04 |
| 2021/0188701 | A1 * | 6/2021 | Roux | F24C 15/10 |
| 2023/0096157 | A1 * | 3/2023 | Zukawa | C03C 25/1063 126/211 |

FOREIGN PATENT DOCUMENTS

| | | | | | |
|---|---|---|---|---|---|
| JP | 2007-101134 | | | 4/2007 | |
| JP | 4059043 | B2 | | 3/2008 | |
| JP | 2008-192455 | A | | 8/2008 | |
| JP | 2008-267633 | A | | 11/2008 | |
| JP | 4998016 | B2 | | 8/2012 | |
| JP | 2013-87986 | A | | 5/2013 | |
| JP | 2013087986 | A | * | 5/2013 | |
| JP | 5694583 | B2 | | 4/2015 | |
| JP | 5991146 | B2 | | 9/2016 | |
| JP | 6259347 | B2 | | 1/2018 | |
| JP | 6280437 | B2 | | 2/2018 | |
| JP | 2021-178774 | A | | 11/2021 | |
| KR | 10-2008-0082620 | A | | 9/2008 | |
| KR | 10-1295565 | B1 | | 8/2013 | |
| KR | 10-2015-0032836 | A | | 3/2015 | |
| KR | 10-2045587 | B1 | | 11/2019 | |
| KR | 10-2020-0123417 | A | | 10/2020 | |
| WO | WO 94/07659 | A1 | | 4/1994 | |
| WO | WO-2013171047 | A1 | * | 11/2013 | C03C 21/008 |
| WO | WO-2021172129 | A1 | * | 9/2021 | C03C 17/3411 |

OTHER PUBLICATIONS

International Search Report dated Aug. 16, 2023 for International Application No. PCT/KR2023/005316.
Written Opinion of the International Searching Authority dated Aug. 16, 2023 for International Application No. PCT/KR2023/005316.
Beall et al., "Ion-Exchange in Glass-Ceramics", Frontiers in Materials, vol. 3, Article 41, Aug. 2016, pp. 1-11.
Ahn et al., "A Study on the strengthening of Sodalime glass using ion exchange method", Journal of the Korean Society of Manufacturing Process Engineers, vol. 13, No. 6, 2014, pp. 145-151.

* cited by examiner

TRANSPARENT CERAMIC GLASS FOR COOKTOP AND COOKTOP COMPRISING SAME

CROSS-REFERENCE TO RELATED APPLICATIONS

This application is a continuation application of International Application No. PCT/KR2023/005316, filed on Apr. 19, 2023, and claims priority to Korean Patent Application No. 10-2022-0067819, filed on Jun. 2, 2022 and Korean Patent Application No. 10-2022-0102339, filed on Aug. 16, 2022, the disclosures of which are incorporated by reference herein in their entireties.

BACKGROUND

1. Field

The present disclosure relates to a transparent glass-ceramic for a cooktop, and a cooktop including the same.

2. Description of the Related Art

Induction ranges (induction heating apparatuses) have been used as heat sources to generate heat. Particularly, cooktops (or hobs) have been used as cooking apparatuses for heating food using induction ranges.

In general, glass-ceramic with excellent heat resistance has been used on the top of cooktops. Glass-ceramic has excellent mechanical strength and thermal conductivity and are rarely fractured by thermal shock.

Glass-ceramic is classified into white, black, and transparent glass-ceramic according to color. Among them, transparent glass-ceramic has low aesthetic property due to high scratch visibility. In addition, transparent glass-ceramic having low color heat resistance discolor at a high temperature.

Conventionally, attempts have been made to solve such problems described above by forming a separate coating layer on transparent glass-ceramic. However, to manufacture a transparent glass-ceramic having a coating layer, additional costs for forming the coating layer are required and there are limits to reducing scratch visibility.

SUMMARY

Aspects of embodiments of the disclosure will be set forth in part in the description which follows and, in part, will be apparent from the description, or may be learned by practice of the presented embodiments.

According to an embodiment of the disclosure, a transparent glass-ceramic for a cooktop may include a glass material having an uneven layer etched on an upper surface of the glass material; an upper printed layer formed on the uneven layer; and a lower printed layer formed under the glass material.

According to an embodiment of the disclosure, the transparent glass-ceramic further includes an outermost coating layer disposed on the upper printed layer.

According to an embodiment of the disclosure, the glass material has a thickness of 3 to 5 mm.

According to an embodiment of the disclosure, the upper printed layer includes at least one of an UX printed layer and an UI printed layer.

According to an embodiment of the disclosure, the lower printed layer includes a high-chroma color layer, and a heat-resistant shielding layer formed under the high-chroma layer.

According to an embodiment of the disclosure, the heat-resistant shielding layer is an inorganic printed layer including at least one of C, Si, Ti, Cr, Cu and Al.

According to an embodiment of the disclosure, the uneven layer etched on the upper surface has a surface roughness Ra from 3 to 5 μm.

According to an embodiment of the disclosure, the glass material having the uneven layer etched on the upper surface has a transmittance from 10 to 95%.

According to an embodiment of the disclosure, the glass material having the uneven layer etched on the upper surface has a 60° gloss from 2 to 10 GU.

According to an embodiment of the disclosure, a water contact angle of the glass material having the uneven layer etched on the upper surface is 90° or more.

According to an embodiment of the disclosure, a method of manufacturing a transparent glass-ceramic for a cooktop may include preparing a glass-ceramic precursor by melting a glass-ceramic in powder form and then cooling the glass-ceramic; heating the glass-ceramic precursor to form crystals in the glass-ceramic; cooling the glass-ceramic in which the crystals are formed; etching and blasting a surface of the cooled glass-ceramic; polishing the etched and blasted glass-ceramic; and printing on the polished glass-ceramic.

According to an embodiment of the disclosure, the etching is performed by immersing the cooled glass-ceramic in hydrofluoric acid for 60 to 180 minutes.

According to an embodiment of the disclosure, the etched and blasted glass-ceramic has a surface roughness Ra of 5 to 15 μm.

According to an embodiment of the disclosure, a cooktop may include a cooktop main body; and a first glass provided on the cooktop main body, wherein the first glass includes a glass-ceramic including a glass material having an uneven layer etched on an upper surface of the glass material, an upper printed layer formed on the uneven layer, and a lower printed layer formed under the glass material.

According to an embodiment of the disclosure, the cooktop main body includes a heater, and the cooktop further includes a second glass disposed in line with the first glass, a coupler configured to detachably couple the first glass and the second glass together, a circuit board disposed under the second glass, and a coil mount disposed under the heater and configured to seat the heater.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
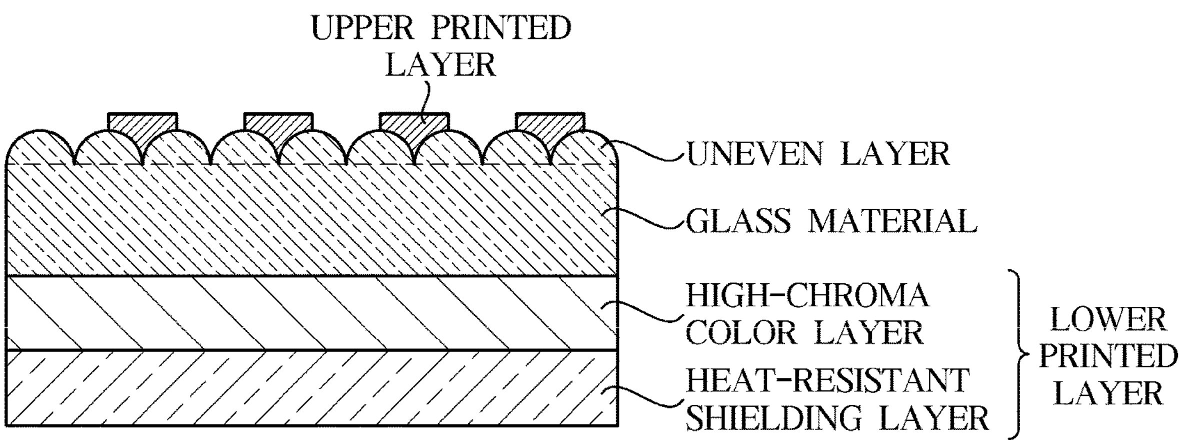
FIG. 1 is a schematic diagram of a transparent glass-ceramic for a cooktop according to an embodiment of the disclosure.

Hereinafter, embodiments of the present disclosure will be described in detail with reference to the accompanying drawings. These embodiments are provided to fully convey the concept of the present disclosure to those of ordinary skill in the art. The present disclosure may, however, be embodied in many different forms and should not be construed as limited to the exemplary embodiments set forth herein. In the drawings, parts unrelated to the descriptions are omitted for clear description of the disclosure and sizes of elements may be exaggerated for clarity.

Throughout the specification, the term "comprising" or "including" an element specifies the presence of the stated element, but does not preclude the presence or addition of one or more elements, unless otherwise stated.

An expression used in the singular encompasses the expression of the plural, unless otherwise indicated.

Embodiments of the disclosure may provide a transparent glass-ceramic for a cooktop having low scratch visibility and excellent cleanability by controlling surface roughness, and a cooktop including the same.

Throughout the specification, the term "a transparent glass-ceramic" may also be referred to as a transparent ceramic glass.

A transparent glass-ceramic for a cooktop according to an embodiment may include a glass material having an uneven layer formed on the surface, an upper printed layer formed on the uneven layer, and a lower printed layer formed under the glass material.

In addition, the transparent glass-ceramic may further include an outermost coating layer provided on the upper printed layer.

FIG. 1 is a schematic diagram of a transparent glass-ceramic for a cooktop according to an embodiment.

Referring to FIG. 1, a transparent glass-ceramic for a cooktop according to an embodiment includes a glass material having an uneven layer formed on the surface, an upper printed layer, and a lower printed layer.

The glass material may include, in percent by weight (wt %), 3 to 10% of $Li_2O$, 15 to 25% of $Al_2O_3$, and the balance of $SiO_2$ and impurities.

$Li_2O$ serves to increase hardness of a glass-ceramic. Thus, with a low content of $Li_2O$, the glass-ceramic may not have a sufficient hardness. However, an excess of $Li_2O$ may increase manufacturing costs.

$Al_2O_3$ serves to improve corrosion resistance and durability of a glass-ceramic. Therefore, with a low content of $Al_2O_3$, corrosion resistance and durability of the glass-ceramic may deteriorate. However, an excess of $Al_2O_3$ may increase manufacturing costs.

$SiO_2$ serves as a nucleating agent in a glass-ceramic. Therefore, with a low content of $SiO_2$, crystals are not sufficiently formed in the glass-ceramic and thus reflectance may deteriorate. However, an excess of $SiO_2$ may deteriorate hardness and durability of the glass-ceramic.

In addition, unintended impurities may inevitably be incorporated from raw materials or surrounding environments during a common manufacturing process, and thus addition of other impurities is not excluded. These impurities are known to any person skilled in the art of manufacturing and details thereof are not specifically mentioned in the present disclosure.

In the glass-ceramic according to an embodiment of the present disclosure, the glass material may have a thickness of 3 to 5 mm. However, the embodiment is not limited thereto and the thickness of the glass material may vary according to the purpose and shape.

The upper printed layer may include at least one of an UX printed layer and an UI printed layer. The upper printed layer may be formed to indicate the centers of induction elements on the top of the glass material. The upper printed layer may have a pattern in the form of a line or a cross to indicate the center of the induction element, but the embodiment is not limited thereto.

The lower printed layer may include a high-chroma color layer and a heat-resistant shielding layer.

The present disclosure relates to a transparent glass-ceramic capable of realizing various high-chroma colors unlike black glass-ceramic and white glass-ceramic. Therefore, clear high-chroma colors may be realized by disposing the high-chroma color layer under the transparent glass-ceramic.

The heat-resistant shielding layer may serve to improve high-temperature heat resistance of the transparent glass-ceramic. Therefore, the transparent glass-ceramic including the heat-resistant shielding layer may have a high-chroma color maintained even after being exposed to a high temperature for a long time.

The heat-resistant shielding layer may be an inorganic printed layer including at least one of C, Si, Ti, Cr, Cu and Al.

An outermost coating layer formed on the upper printed layer may include at least one of antifouling coating, oleophobic coating, and anti-fingerprint coating. By forming the outermost coating layer, the transparent glass-ceramic for a cooktop may have a water contact angle of 90° or more. That is, cleanability may be improved by increasing the contact angle using the outermost coating layer.

The transparent glass-ceramic for a cooktop may have a surface roughness Ra of 3 to 5 μm by etching, blasting and polishing processes which will be described below.

With a surface roughness Ra below 3 μm, scratch visibility of the glass-ceramic increases resulting in deterioration of aesthetic property. However, with a surface roughness Ra exceeding 5 μm, cleanability of the glass-ceramic may deteriorate. That is, the present disclosure may simultaneously control scratch visibility and cleanability, which are in a trade-off relationship, by optimizing the surface roughness.

Aesthetic property of the transparent glass-ceramic for a cooktop may be improved by disposing the high-chroma color layer under the transparent glass-ceramic. More specifically, a transparent glass-ceramic having a black color layer may have a value L of 25 to 30 when measured using a color-difference meter, a transparent glass-ceramic having a dark grey color layer may have a value L of 30 to 35 when measured using a color-difference meter, a transparent glass-ceramic having silver and pink color layers may have a value L of 65 to 70 when measured using a color-difference meter, and a transparent glass-ceramic having a beige color layer may have a value L of 70 to 75 when measured using a color-difference meter.

The transparent glass-ceramic for a cooktop may have a transmittance of 10 to 95%. Therefore, an LCD substrate may be used under the glass-ceramic for a cooktop using high transmittance, and various colors may be realized. Preferably, the transmittance may be from 30 to 80%, and more preferably, the transmittance may be from 60 to 70%.

The transparent glass-ceramic for a cooktop may have a 60° gloss of 2 to 10 GU. Therefore, the transparent glass-ceramic for a cooktop may have low scratch visibility due to low gloss.

Hereinafter, a method of manufacturing a transparent glass-ceramic for a cooktop according to another embodiment of the present disclosure will be described.

The method of manufacturing a transparent glass-ceramic for a cooktop according to the embodiment may include: preparing a glass-ceramic precursor; forming crystals by heating the glass-ceramic precursor; cooling the glass-ceramic in which the crystals are formed; etching and blasting the cooled glass-ceramic; polishing the etched glass-ceramic; and printing on the polished glass-ceramic.

Figure 2:
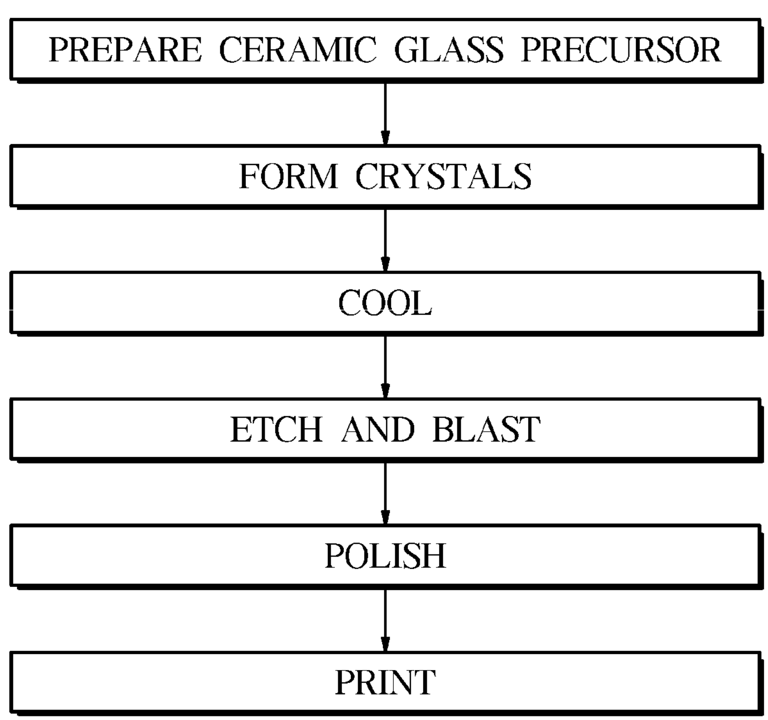
FIG. 2 is a flowchart of a method of manufacturing a transparent glass-ceramic for a cooktop according to an embodiment of the disclosure.

FIG. 2 is a flowchart of a method of manufacturing a transparent glass-ceramic for a cooktop according to an embodiment.

Referring to FIG. 2, the method of manufacturing the transparent glass-ceramic for a cooktop according to an embodiment of the present disclosure may include a series of the glass-ceramic precursor-preparing process, crystal-forming process, cooling process, etching and blasting process, polishing process, and printing process.

In addition, the method of manufacturing the transparent glass-ceramic for a cooktop may further include forming an outermost coating layer, if required, to further improve cleanability.

First, glass-ceramic prepared in the form of powder is melted at a temperature of 1400 to 1600° C. and then cooled to room temperature at a rate of or less to prepare a glass-ceramic precursor.

Then, the crystal-forming process is performed to form crystals in the glass-ceramic. The crystal-forming process may include a first heat treatment performed at a temperature of 600 to 800° C. for 10 to 20 minutes and a second heat treatment performed at a temperature of 800 to 1000° C. for 20 to 30 minutes.

Nuclei for crystallization are formed in the glass-ceramic by the first heat treatment, and crystallization proceeds by growing the nuclei by the second heat treatment.

A too low temperature of the crystal-forming process or a too short time for the process may cause insufficient formation of crystals, resulting in deterioration of clarity of colors and reflectance. However, a too high temperature of the crystal-forming process or a too long time for the process may cause a decrease in productivity. Therefore, it is desirable to set appropriate levels of the temperature and time for the crystal-forming process temperature.

The glass-ceramic that has undergone the crystal-forming process may be cooled to lower the temperature of the glass-ceramic to room temperature.

Subsequently, the process of etching and blasting the surface of the cooled glass-ceramic may be performed.

Figure 3:
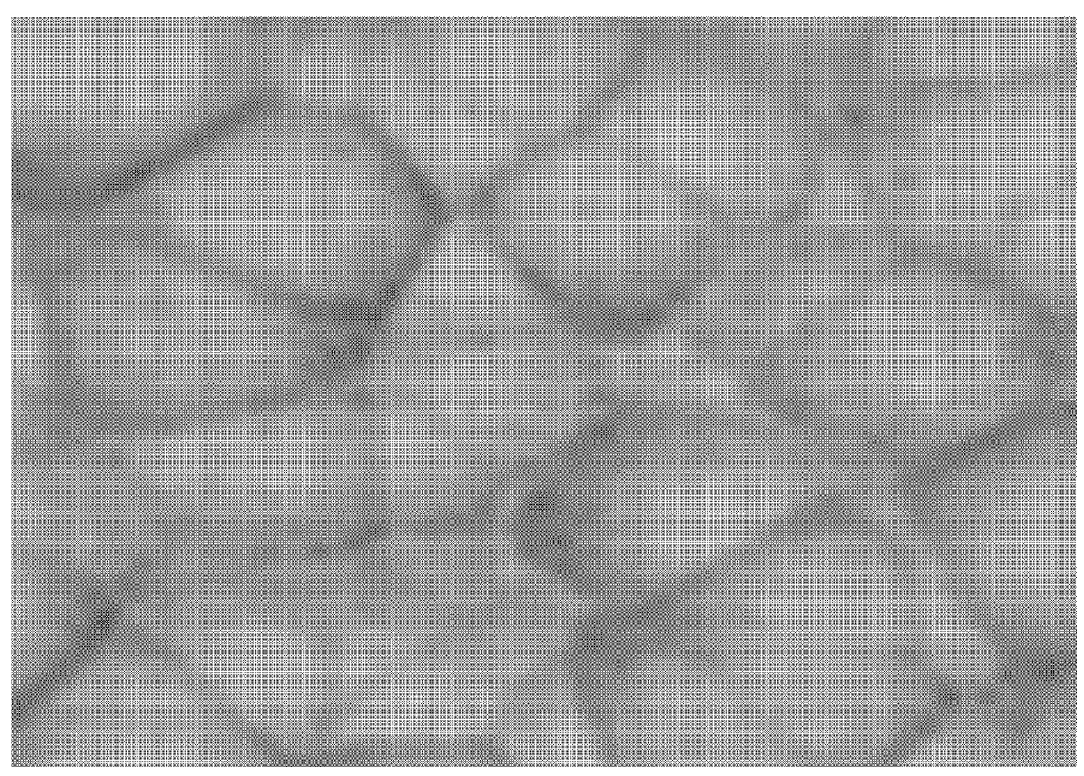
FIG. 3 is an image of a surface of a transparent glass-ceramic after etching and blasting according to an embodiment of the disclosure.

FIG. 3 is an image of a surface of a transparent glass-ceramic after etching and blasting.

In the etching and blasting process, the uneven layer may be formed by etching the surface of the glass-ceramic. The etched and blasted glass-ceramic may have a surface roughness Ra of 5 to 15 μm.

Referring to FIG. 3, formation of a uniform uneven layer on the surface of the etched and blasted transparent glass-ceramic may be confirmed.

The etching may be chemical etching. The etching may be performed by immersing the glass-ceramic in hydrofluoric acid. More specifically, the etching may be performed by spraying hydrofluoric acid onto the surface of the transparent glass-ceramic at room temperature and immersing the transparent glass-ceramic in hydrofluoric acid for 60 to 180 minutes.

The blasting process may be performed by using diamond or both diamond and boron carbide.

Subsequently, the etched and blasted glass-ceramic may be polished. The polishing process may be performed for 5 to 10 minutes. The glass-ceramic that has undergone the polishing process may have a surface roughness Ra of 3 to 5 μm.

Then, a process of printing the upper and lower printed layers on the polished glass-ceramic may be performed.

The upper printed layer may include at least one of the UX printed layer and the UI printed layer. The lower printed layer may include the high-chroma color layer and the heat-resistant shielding layer.

In the process of forming the outermost coating layer, at least one of antifouling coating, oleophobic coating, and anti-fingerprint coating may be formed.

Hereinafter, a cooktop according to another embodiment of the present disclosure will be described.

A cooktop according to an embodiment may include a cooktop main body, and a first glass provided on the cooktop main body, wherein the first glass includes a glass-ceramic, and the glass-ceramic may include a glass material having an uneven layer formed on the surface, an upper printed layer formed on the uneven layer, and a lower printed layer formed under the glass material.

In addition, the cooktop main body may include a heater, and the cooktop may include a second glass disposed on the same line as the first glass; a coupler allowing the first glass and the second glass to be detachably coupled to each other; a circuit board disposed under the second glass; and a coil mount disposed under the heater for seating the heater.

An outermost coating layer may further be disposed on the upper printed layer, the lower printed layer may include a high-chroma color layer and a heat-resistant shielding layer, and the glass-ceramic may have a surface roughness Ra of 3 to 5 μm and a transmittance of 10 to 95%.

The glass material is as described above and hereinafter, the cooktop will be described in more detail.

The cooktop according to an embodiment of the present disclosure may include a cooktop main body, and a first glass disposed on the cooktop main body, wherein the first glass may include a glass-ceramic.

In addition, the cooktop main body may include a heater, and the cooktop may include a second glass disposed on the same line as the first glass, a coupler allowing the first glass and the second glass to be detachably coupled to each other, a circuit board disposed under the second glass, and a coil mount disposed under the heater for seating the heater.

Figure 4:
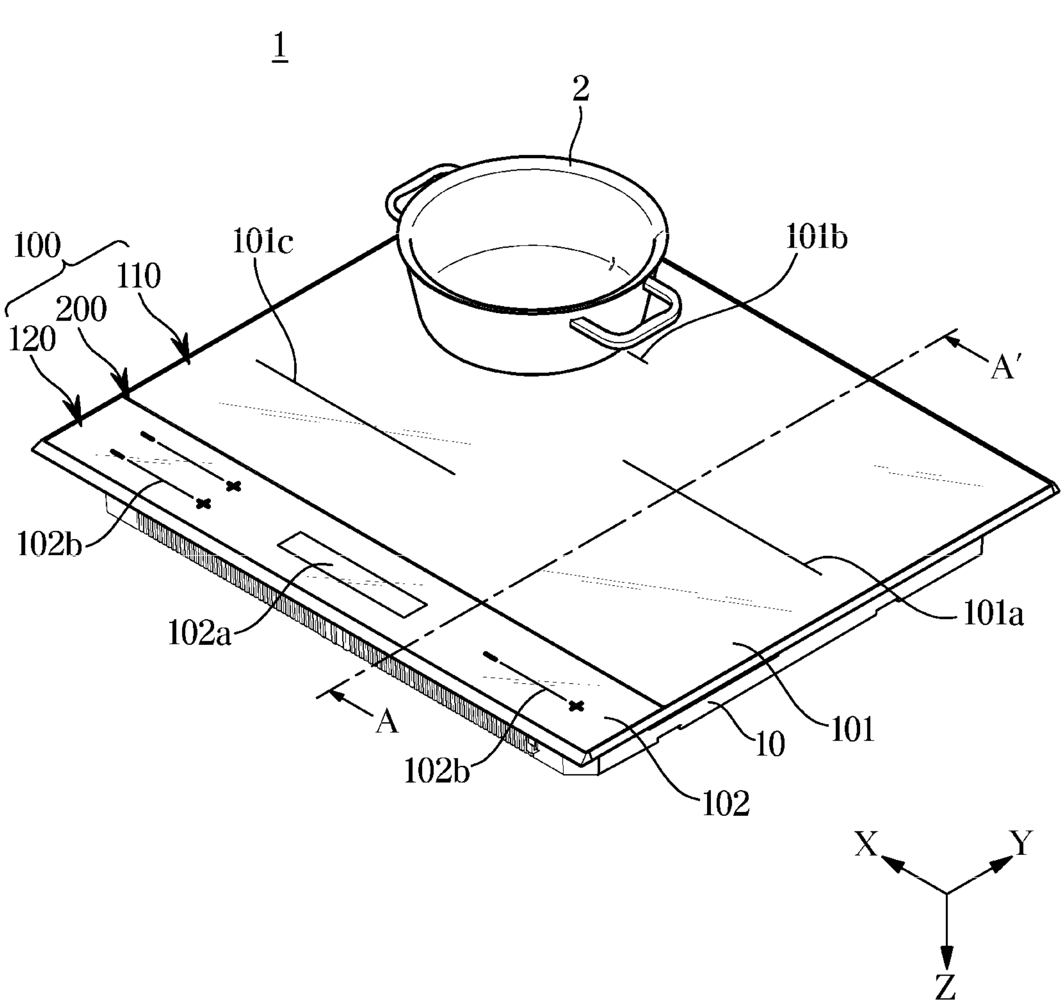
FIG. 4 is a diagram of a cooktop according to an embodiment of the disclosure.
Figure 5:
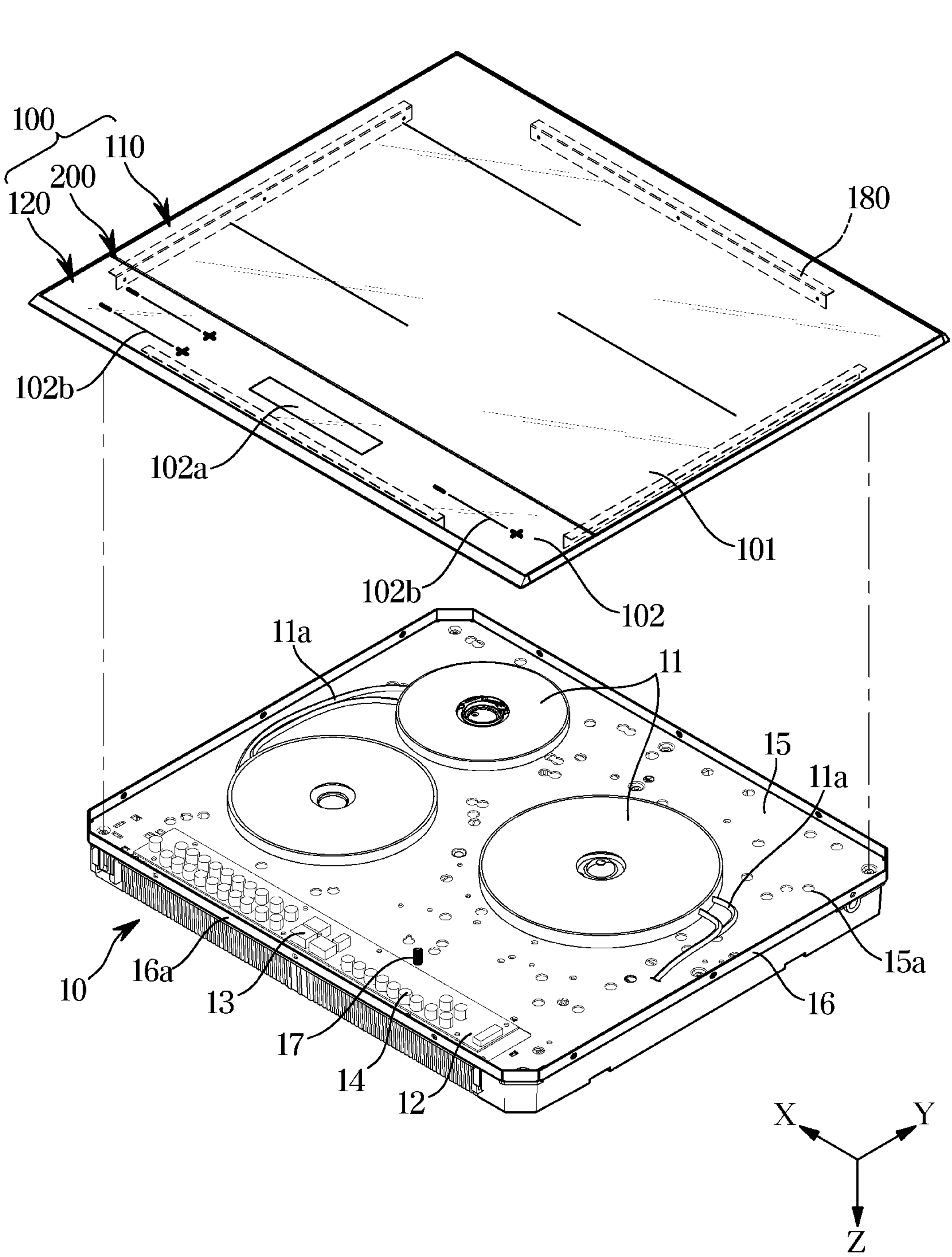
FIG. 5 is an exploded perspective view of a cooktop according to an embodiment of the disclosure.

FIG. 4 is a diagram of a cooktop according to an embodiment. FIG. 5 is an exploded perspective view of a cooktop according to an embodiment of the present disclosure.

Referring to FIGS. 4 and 5, a cooktop 1 according to an embodiment of the present disclosure may include a cooktop main body 10 and a first glass 110 disposed on the cooktop main body 10.

In addition, the cooktop 1 according to an embodiment of the present disclosure may include a heater (hereinafter, referred to as induction heating coil 11), a second glass 120, a coupler 200, a circuit board 12, and a coil mount 15.

The main body 10 may define an exterior appearance of the cooking apparatus 1. The induction heating coil 11 may be accommodated in the main body 10 and generate a magnetic field for induction heating of a cooking vessel 2. The induction heating coil 11 may be electrically connected to a main substrate (not shown) provided inside the main body 10 via an electric wire 11*a*.

The glass 100 may include a first glass 110 constituting a first region 101 and a second glass 120 constituting a second region 102.

The circuit board 12 may be disposed under the second glass 120. The circuit board 12 may include a display device 13 and a touch device 14. The display device 13 may be disposed under a display 102*a* formed at the second region 102. The display device 13 may display whether the cooking vessel 2 is heated by the induction heating coil 11. Thus, a user may determine whether the cooking vessel 2 is heated via the display 102*a*. The touch device 14 may be disposed under an input device 102*b* formed at the second region 102. The touch device 14 may receive a tough signal from the input device 102*b*. For example, the touch device 14 may receive an input by a capacitive touch method. However, the embodiment is not limited thereto, and the touch device 14 may receive an input by a resistive touch method. The user may adjust a current flowing in the induction heating coil and determine the degree of heating the cooking vessel 2 via the input device 102*b*.

The induction heating coil 11 may be seated on the coil mount 15. A coil mounting hole 15*a* may be provided in the coil mount 15 to mount the induction heating coil 11. The coil mounting hole 15*a* may be provided in plural.

The main body 10 may further include a first frame 16 provided to support the glass 100. The first frame 16 may be provided to support the glass 100 disposed on the top thereof. The first frame 16 may be formed by extending upward from four ends of the coil mount 15. The first frame 16 is provided such that the glass 100 is seated in the main body 10 and supported thereby.

The first glass 110 may include the upper printed layer (heating area guides 101*a*, 101*b*, and 101*c*) and support the cooking vessel 2. The cooking vessel 2 may be located in the first region 101.

The second glass 120 may include a second region 102, and the second region 102 may include the display 102*a* and the input device 102*b*. The display 102*a* is located in the second region 102 to display various information about the cooking apparatus 1, and the input device 102*b* may be located in the second region 102 to receive a control command from the user.

The first glass 110 and the second glass 120 are physically separated from each other and may be detachably coupled to each other by the coupler 200. The first glass 110 and the second glass 120 may be detachably coupled to each other by the coupler 200.

The first glass 110 constitutes the first region 101 and the cooking vessel 2 may be located on the first region 101. The cooking vessel 2 located on the first glass 110 may be induction-heated by a magnetic field generated by the induction heating coil 15.

The second glass 120 constitutes the second region 102 separated from the first region 101, and cooking information including temperature of the cooking vessel 2, cooking time, and/or date/time may be displayed in the second region 102 via the display 102*a*.

Also, the input device 102*b* configured to receive a control command from the user may be provided in the second region 102 to turn on/off the cooking apparatus 1 or control the temperature of the cooking vessel 2. The input device 102*b* may receive an input by a touch of the user.

The second glass 120 may be a tempered glass. The first glass 110 may be formed of a material different from that used to form the second glass 120. For example, the first glass 110 may be formed of a glass-ceramic having excellent heat resistance, and the second glass 120 may have a property of transferring a touch signal to the circuit board 12 provided at a lower portion via a touch.

The first glass 110 and the second glass 120 may be detachably coupled to each other by the coupler 200. Specifically, the second glass 120 may be detachably coupled to the first glass 110 by the coupler 200. The second glass 120 may be coupled to the front of the first glass 110. The second glass 120 may cover one side of the first glass 110 when coupled to the first glass 110.

In addition, maintenance and repair of the circuit board 12 located in the second region 102 may be easily performed because the second glass 120 corresponding to the second region 102 is easily separated and replaced.

Hereinafter, the present disclosure will be described in more detail with reference to the following examples and comparative examples. However, the following examples are merely presented to exemplify the contents and effects of the present disclosure, and the scope and effects of the present disclosure are not limited thereto.

EXAMPLES

<Scratch Resistance Test>

Table 1 below shows that vertical forces at the time of scratching in comparative examples and an example.

Comparative Example 1 shows a transparent glass-ceramic without a coating layer, Comparative Example 2 shows a transparent glass-ceramic with an ALSiN coating layer, Comparative Example 3 shows a transparent glass-ceramic with a DLC coating layer, and Example 1 shows a transparent glass-ceramic with an uneven layer according to an embodiment.

Figure 6:
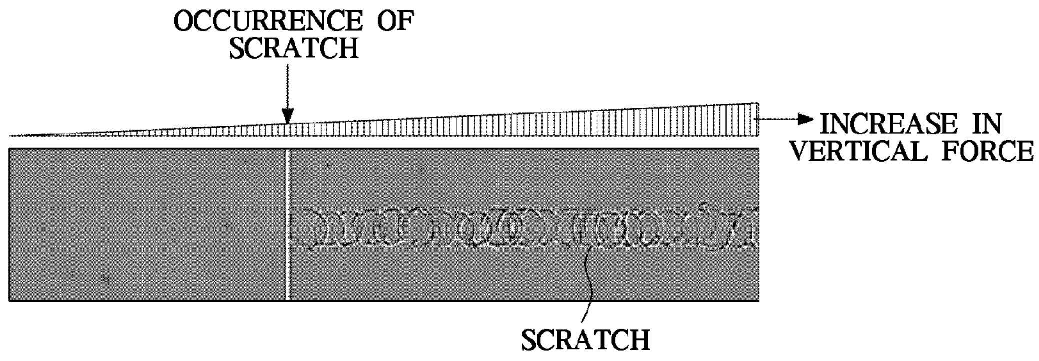
FIG. 6 is a schematic diagram of a scratch resistance test according to an embodiment of the disclosure.

The scratch resistance test was a variable load scratch test. FIG. 6 is a schematic diagram of a scratch resistance test.

Referring to FIG. 6, as a method for testing scratch resistance, a variable load scratch test was performed according to the ASTM c-1624-05 Standard Test Method using a Fischerscope®-HM2000 device. In this regard, a vertical force applied to the specimens was increased at a steady rate from 0.5 N to 20 N, and scratch behavior was observed using an optical or electron microscope while moving each specimen at a rate of 240 mm/s.

TABLE 1

| Category | Vertical force (N) at the time of scratching |
|---|---|
| Comparative Example 1 | 11.5 |
| Comparative Example 2 | 12.2 |
| Comparative Example 3 | 13.0 |
| Example 1 | 17.0 |

Referring to Table 1, it was confirmed that scratch resistance according to Comparative Examples 2 and 3 having the coating layer was higher than that according to Comparative Example 1 without the coating layer. However, the scratch resistance according to Example 1 was the highest by forming the uneven layer rather than the coating layer.

<Scratch Visibility Test>

Table 2 below shows of surface roughness Ra and degrees scratch visibility according to the comparative examples and examples.

Comparative Example 4 shows a transparent glass-ceramic not having a coating and including a black lower printed layer, and Comparative Example 5 shows a transparent glass-ceramic not having a coating and including a pink lower printed layer. Example 2 shows a transparent glass-ceramic having an uneven layer and including a black lower printed layer, and Example 3 shows a transparent glass-ceramic having an uneven layer and including a pink lower printed layer.

The surface roughness Ra was obtained by measuring a vertical movement of a stylus tip vertically moving on a surface of each specimen at room temperature (25° C.) using a surface roughness measuring device.

The scratch visibility test was performed by reciprocating a sandpaper at 100 rpm using an abrasion resistance tester and observing scratches formed thereon using an optical microscope. In this case, a scratch width greater than 5 mm was evaluated as Lv.1, a scratch width greater than 2.5 mm and equal to or less than 5 mm was evaluated as Lv.2, a scratch width equal to or greater than 1.0 mm and equal to or less than 2.5 mm was evaluated as Lv.3, a scratch width greater than 0.1 mm and less than 1.0 mm was evaluated as Lv.4, and a scratch width equal to or less than 0.1 mm was evaluated as Lv.5.

TABLE 2

| Category | Surface roughness Ra (μm) | Reciprocating number of sandpaper (times) | Test result |
|---|---|---|---|
| Comparative Example 4 | 0.05 | 1 | Lv.1 |
| | | 10 | Lv.1 |
| | | 25 | Lv.1 |
| | | 50 | Lv.1 |
| Comparative Example 5 | 0.01 | 1 | Lv.3 |
| | | 10 | Lv.3 |
| | | 25 | Lv.3 |
| | | 50 | Lv.3 |
| Example 2 | 4.85 | 1 | Lv.5 |
| | | 10 | Lv.5 |
| | | 25 | Lv.5 |
| | | 50 | Lv.5 |
| Example 3 | 4.73 | 1 | Lv.5 |
| | | 10 | Lv.5 |
| | | 25 | Lv.5 |
| | | 50 | Lv.5 |

Referring to Table 2, upon comparison of Comparative Example 4 with Comparative Example 5, it was confirmed that the transparent glass-ceramic including a black lower printed layer had higher scratch visibility due to a higher reflectance. That is, it was confirmed that the scratch visibility also increases as the reflectance increases.

In addition, although the scratch visibility of Comparative Examples 4 and 5 was high due to too low surface roughness, the scratch visibility of Examples 2 and 3 was reduced by optimizing surface roughness by forming an uneven layer.

Figure 7:
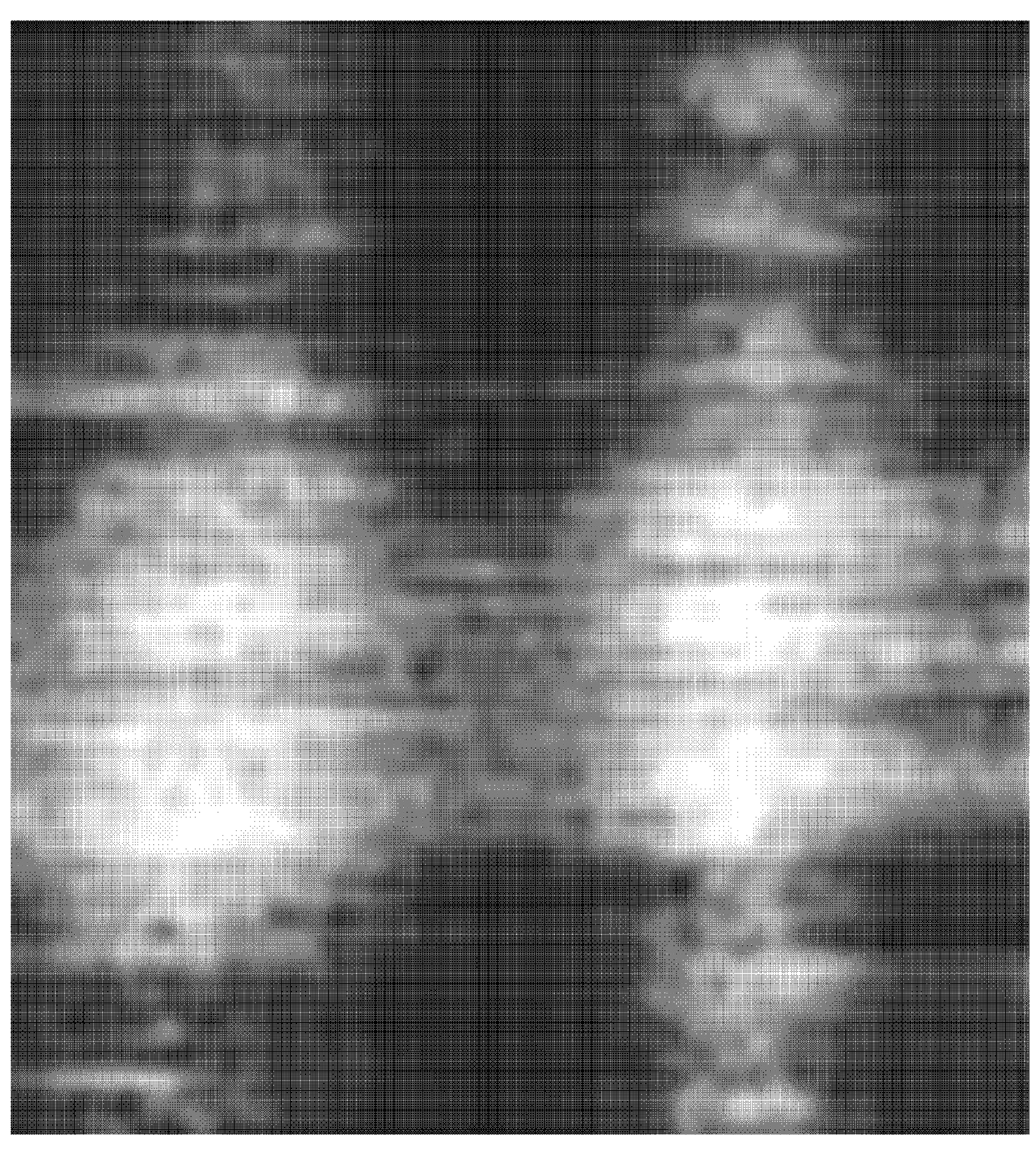
FIG. 7 is an image showing a scratch test result of Comparative Example 4 according to an embodiment of the disclosure.
Figure 8:
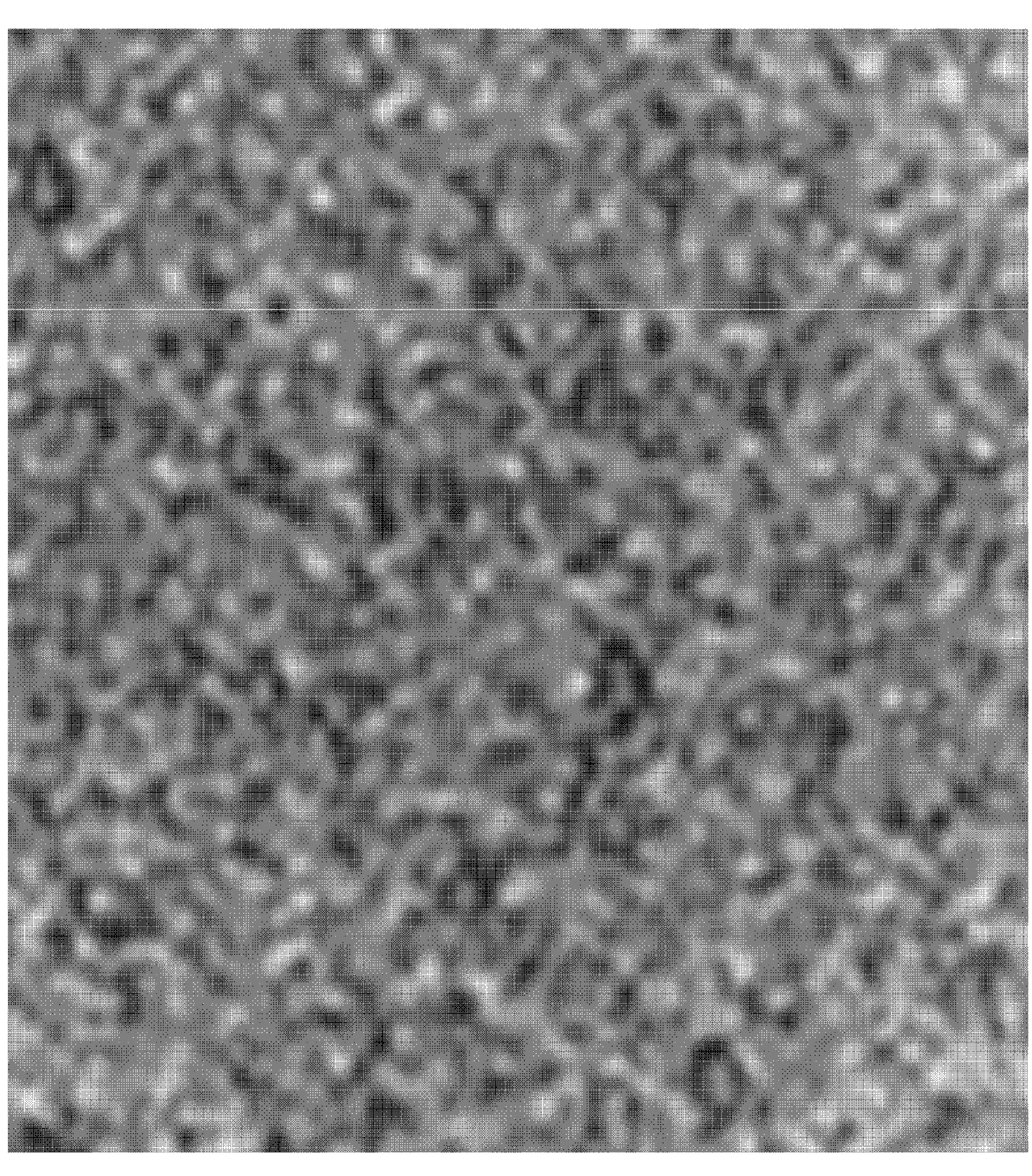
FIG. 8 is an image showing a scratch test result of Example 2 according to an embodiment of the disclosure.

FIG. 7 is an image showing a scratch test result of Comparative Example 4, and FIG. 8 is an image showing a scratch test result of Example 2. Referring to FIGS. 7 and 8, it may be confirmed that the transparent glass-ceramic according to the embodiment has significantly low scratch visibility by forming the uneven layer.

<Fingerprint Visibility Test>

Table 3 below shows gloss and fingerprint visibility of comparative examples and examples.

Gloss was measured according to the ASTM D523. D2457 standard at room temperature at a measurement angle of 60° using a BYK #4446 glossmeter.

The degree of fingerprint visibility was measured by pressing each of the specimens of the comparative examples and examples for 10 seconds with a finger and measuring a color difference ΔE between a region pressed by the finger and another region not pressed thereby.

The color difference ΔE was obtained by measuring L*a*b* color-difference using Spectrophotometer CM-2600d.

TABLE 3

| Category | Gloss (GU) | Color difference value |
|---|---|---|
| Comparative Example 4 | 92.3 | 1.5 |
| Comparative Example 5 | 106 | 1.2 |
| Example 2 | 4.2 | 0.1 |
| Example 3 | 2.5 | 0.1 |

Referring to Table 3, Comparative Examples 4 and 5 show very high glosses and relatively high color difference values between the region pressed by the finger and the region not pressed by the finger. That is, Comparative Examples 4 and 5 had high fingerprint visibility.

However, Examples 2 and 3 including the uneven layer had low glosses and very low color difference values between the region pressed by the finger and the region not pressed by the finger. That is, Examples 2 and 3 exhibited low fingerprint visibility.

Figure 9:
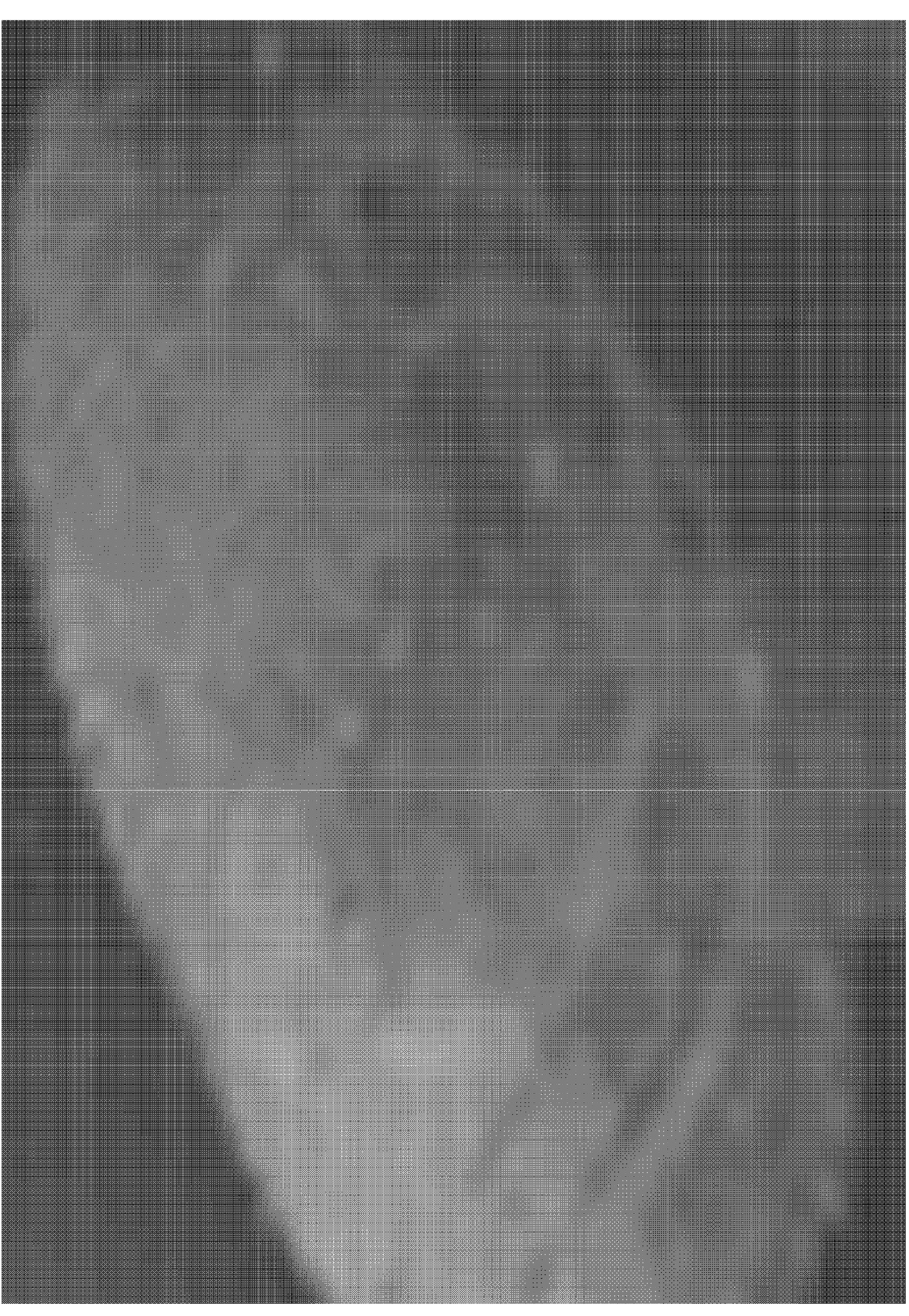
FIG. 9 is an image showing a fingerprint visibility test result of Comparative Example 4 according to an embodiment of the disclosure.
Figure 10:
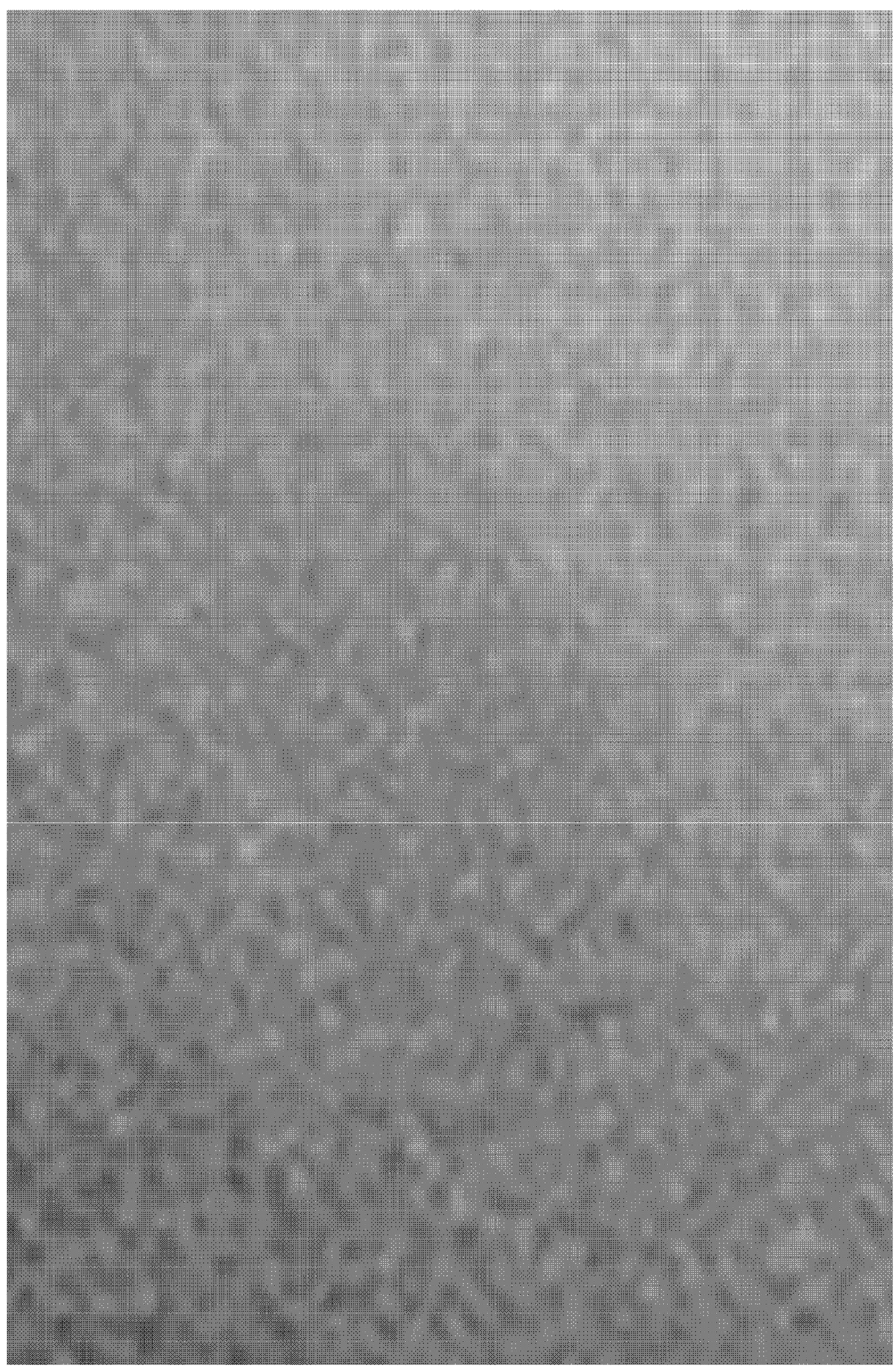
FIG. 10 is an image showing a fingerprint visibility test result of Example 2 according to an embodiment of the disclosure.

FIG. 9 is an image showing a fingerprint visibility test result of Comparative Example 4. FIG. 10 is an image showing a fingerprint visibility test result of Example 2.

Referring to FIGS. 9 and 10, it was confirmed that the transparent glass-ceramic according to an embodiment has a significantly low fingerprint visibility by forming the uneven layer.

<Evaluation of Cleanability>

Cleanability evaluation was obtained by applying a cooking oil to a part of the surface of each specimen of Example 2 and Comparative Example 6, heating the oil at 220° C. for 30 minutes, and measuring a color difference value ΔE before and after the heating.

Comparative Example 6 shows a transparent glass-ceramic having a surface roughness Ra of 7 μm because the polishing process was not performed.

While Example 2 shows a color difference value ΔE of 0.6, Comparative Example 6 shows a color difference value ΔE of 1.5. That is, it was confirmed that the transparent glass-ceramic according to an embodiment also had excellent cleanability by optimizing the surface roughness by the polishing process.

<Evaluation of Heat Resistance>

Heat resistance was evaluated by heating the specimens of Example 3 and Comparative Example 5 (a width of 100 mm×a length of 100 mm) at 350° C. for 100 hours, removing a contaminant using a scrapper or water, and measuring color difference values ΔE before and after contamination.

While Example 3 including the heat-resistant shielding layer exhibited a color difference value ΔE of 0.4, Comparative Example 5 not including the heat-resistant shielding layer exhibited a color difference value ΔE of 1.35. That is, it was confirmed that the transparent glass-ceramic according to an embodiment has excellent heat resistance because discoloration did not occur even after being exposed to high temperature for a long time due to the heat-resistant shielding layer.

<Contact Angle Test>

A contact angle test was performed by dropping 1.0111 of water droplets onto the specimen and measuring a contact angle at room temperature (25° C.) using a contact angle measuring device of KRUSS.

Figure 11:
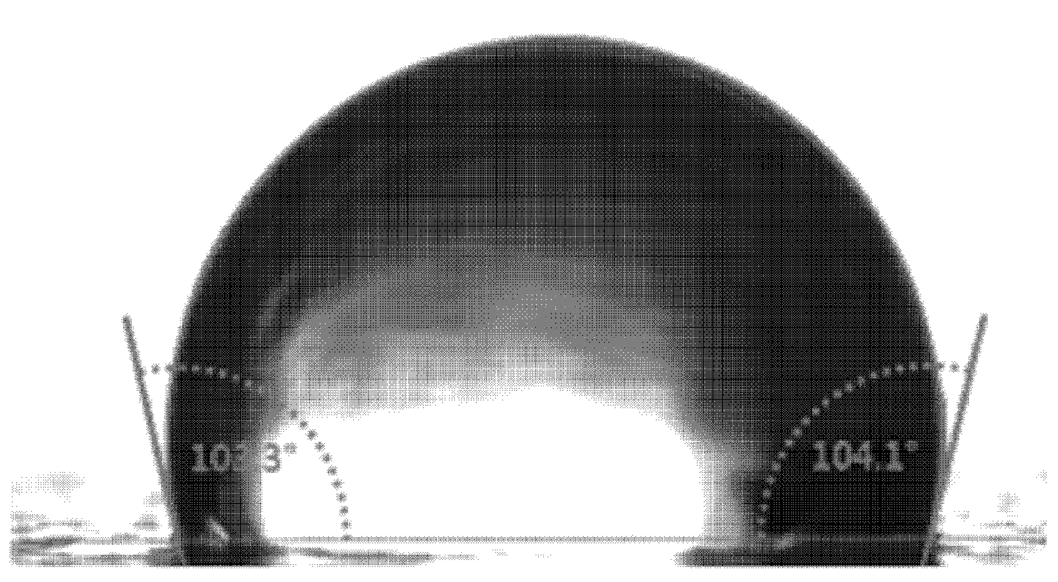
FIG. 11 is an image showing contact angle of a transparent glass-ceramic for a cooktop according to an embodiment of the disclosure.

FIG. 11 is an image showing contact angle of a transparent glass-ceramic for a cooktop according to an embodiment.

Referring to FIG. 11, the transparent glass-ceramic for a cooktop according to an embodiment satisfied a water contact angle of 90° or more by forming the outermost coating layer. That is, cleanability of the transparent glass-ceramic for a cooktop according to an embodiment may further be improved by increasing the contact angle.

According to embodiments of the present disclosure, a transparent glass-ceramic for a cooktop having low scratch visibility and excellent cleanability and a cooktop including the same may be provided by optimizing surface roughness via etching, blasting, and polishing processes.

However, the effects obtainable by the transparent glass-ceramic for a cooktop and the cooktop including the same according to the present disclosure are not limited to the aforementioned effects, and any other effects not mentioned herein will be clearly understood from the following description by those skilled in the art to which the present disclosure pertains.

While the present disclosure has been particularly described with reference to exemplary embodiments, it should be understood by those of skilled in the art that various changes in form and details may be made without departing from the spirit and scope of the present disclosure.

What is claimed is:

1. A transparent cooktop comprising:

a glass-ceramic material having an uneven layer etched on an upper surface, the glass-ceramic material consisting of:

3 to 10 wt. % $Li_2O$, 15 to 25 wt. % $Al_2O_3$, and a balance including $SiO_2$ and impurities;

an upper printed layer on the uneven layer; and a lower printed layer on a lower surface of the glass-ceramic material.

2. The transparent cooktop of claim 1, further comprising:

an outermost coating layer on the upper printed layer.

3. The transparent cooktop of claim 1, wherein the glass-ceramic material has a thickness of 3 to 5 mm.

4. The transparent cooktop of claim 1, wherein the upper printed layer includes at least one of an UX printed layer and an UI printed layer.

5. The transparent cooktop of claim 1, wherein the lower printed layer includes:

a high-chroma color layer on the lower surface, and a heat-resistant shielding layer on the high-chroma color layer such that the high-chroma color layer is between the lower surface and the heat-resistant shielding layer.

6. The transparent cooktop of claim 5, wherein the heat-resistant shielding layer is an inorganic printed layer including at least one of C, Si, Ti, Cr, Cu and Al.

7. The transparent cooktop of claim 1, wherein the uneven layer etched on the upper surface has a surface roughness (Ra) of 3 to 5 μm.

8. The transparent cooktop of claim 1, wherein the glass-ceramic material having the uneven layer etched on the upper surface has a transmittance from 10 to 95%.

9. The transparent cooktop of claim 1, wherein the glass-ceramic material having the uneven layer etched on the upper surface has a 60° gloss from 2 to 10 GU.

10. The transparent cooktop of claim 2, wherein a water contact angle of the glass-ceramic material having the uneven layer etched on the upper surface is 90° or more.

11. A method of manufacturing a cooktop comprising:

preparing a glass-ceramic precursor by melting a powder and then cooling the melted powder to form the glass-ceramic precursor, the powder consisting of:

3 to 10 wt. % $Li_2O$, 15 to 25 wt. % $Al_2O_3$, and a balance including $SiO_2$ and impurities;

heating the formed glass-ceramic precursor to form crystals therein and thereby forming a glass-ceramic material;

cooling the glass-ceramic material in which the crystals are formed;

etching and blasting a surface of the cooled glass-ceramic material;

polishing the etched and blasted glass-ceramic material;

printing on the polished glass-ceramic material; and coupling the printed glass-ceramic material to a cooktop main body to form the cooktop.

12. The method according to claim 11, wherein the etching includes immersing the cooled glass-ceramic material in hydrofluoric acid for 60 to 180 minutes.

13. The method according to claim 11, wherein the etching and blasting the surface results in the surface having a surface roughness Ra of 5 to 15 μm.

14. A cooktop comprising:

a cooktop main body; and a glass-ceramic material having an uneven layer etched on an upper surface, the glass-ceramic material consisting of:

3 to 10 wt. % $Li_2O$, 15 to 25 wt. % $Al_2O_3$, and a balance including $SiO_2$ and impurities;

an upper printed layer on the uneven layer; and a lower printed layer on a lower surface of the glass-ceramic material.

15. The cooktop of claim 14, wherein the glass-ceramic material is a first glass, the cooktop main body includes a heater, and the cooktop further includes:

a second glass in line with the first glass, a coupler that couples the first glass and the second glass together, a circuit board under the second glass, and a coil mount under the heater and on which the heater is configured to be seated.

* * * * *